United States Patent [19]

Start et al.

[11] 4,222,496

[45] Sep. 16, 1980

[54] CONTINUOUS OUTFLOW, WEIGHT-MEASURING BLENDER

[75] Inventors: Rick E. Start, Grand Rapids; Bert Woldring, Hudsonville; Cliff Parker, Grand Rapids, all of

[73] Assignee: Fabri-Coate Company, Inc., Grand Rapids, MI

[21] Appl. No.: 5,269

[22] Filed: Jan. 22, 1979

[51] Int. Cl.³ ............................................ G01G 17/04
[52] U.S. Cl. .................................... 222/16; 177/70; 222/58; 222/77; 417/37
[58] Field of Search .................. 222/1, 14, 16, 21, 31, 222/41, 56, 57, 58, 64, 65, 77, 135, 145; 177/70; 417/37

[56] References Cited

U.S. PATENT DOCUMENTS

| 2,625,301 | 1/1953 | Saxe | 222/77 X |
|---|---|---|---|
| 3,202,317 | 8/1965 | Fath et al. | 222/77 X |
| 3,306,495 | 2/1967 | Wabers | 222/77 |
| 3,362,490 | 1/1968 | Maxwell | 177/70 |
| 3,595,328 | 7/1971 | Griem, Jr. | 177/70 X |

Primary Examiner—Robert J. Spar
Assistant Examiner—Fred A. Silverberg
Attorney, Agent, or Firm—Townsend and Townsend

[57] ABSTRACT

Apparatus and process are provided for weight-blending two or more constituents on a continuous basis. In operation, the constituents are sequentially added to a weight-measuring tank connected to a weight scale with an indicator which undergoes excursion between sensors positions. The scale face has an indicator which undergoes excursion between position sensors, such as electric eyes. When the system is electrically activated, a first position sensor detects zero weight from the measuring tank and remotely calls for the pumping of the first constituent, which continues until the indicator in excursion reaches a second position indicator. Pumping of the first constituent then ceases and pumping of the second constituent commences and continues until the indicator reaches a third position indicator sensor, at which point pumping of the second constituent ceases, the bottom dump valve is activated to a ready state, and the system cycle stops until emptying of the weight-measuring tank into a blend-holding tank occurs. Constant outflow to a production facility is from the blend-holding tank. When a probe measures a predetermined remaining level of blend within the blend-holding tank, the bottom dump valve empties the weighted measuring tank by gravity flow. When the indicator reaches the zero position, the bottom dump valve closes, is deactivated, and the cycle repeats.

1 Claim, 2 Drawing Figures

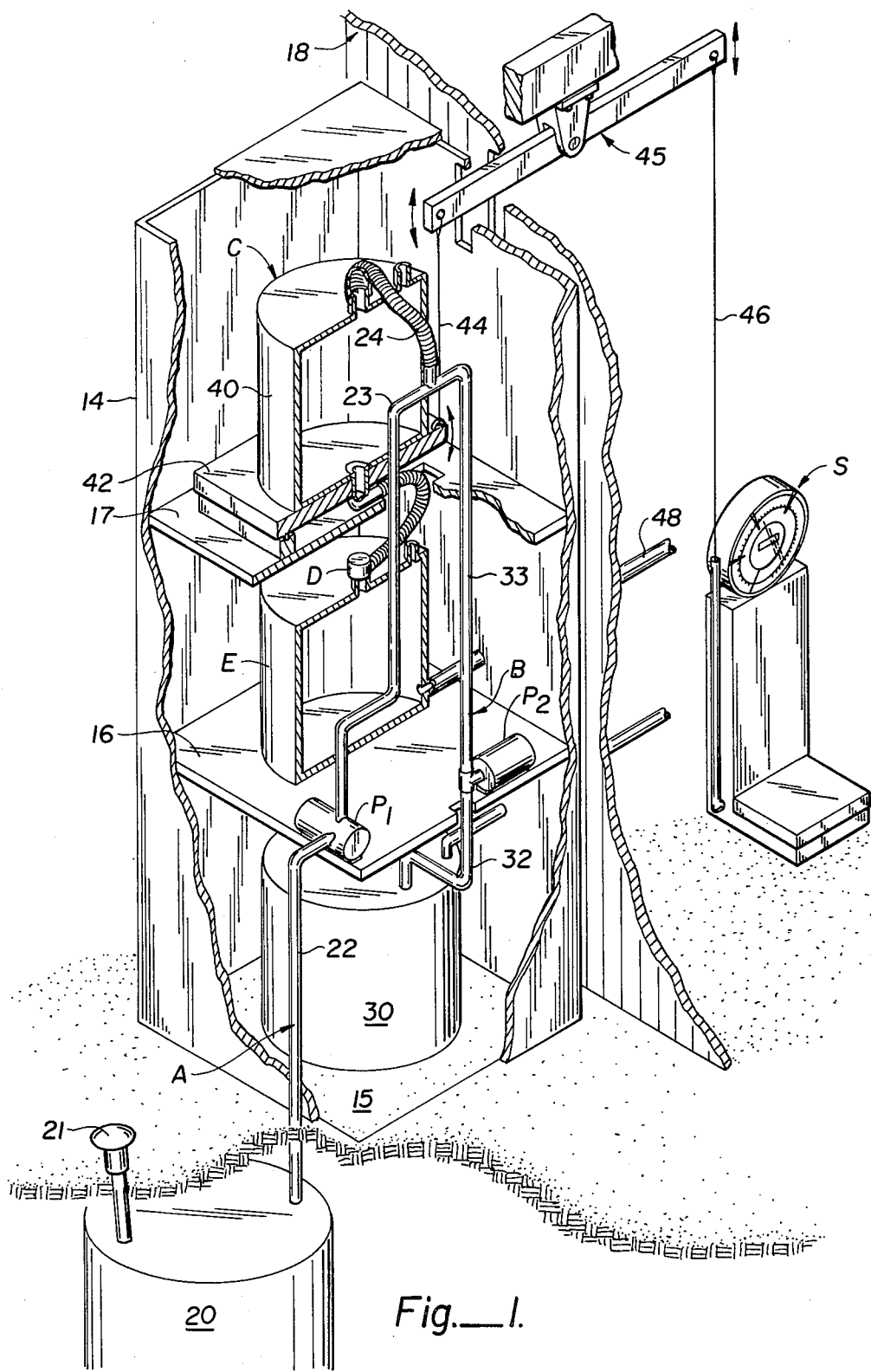
Fig._1.

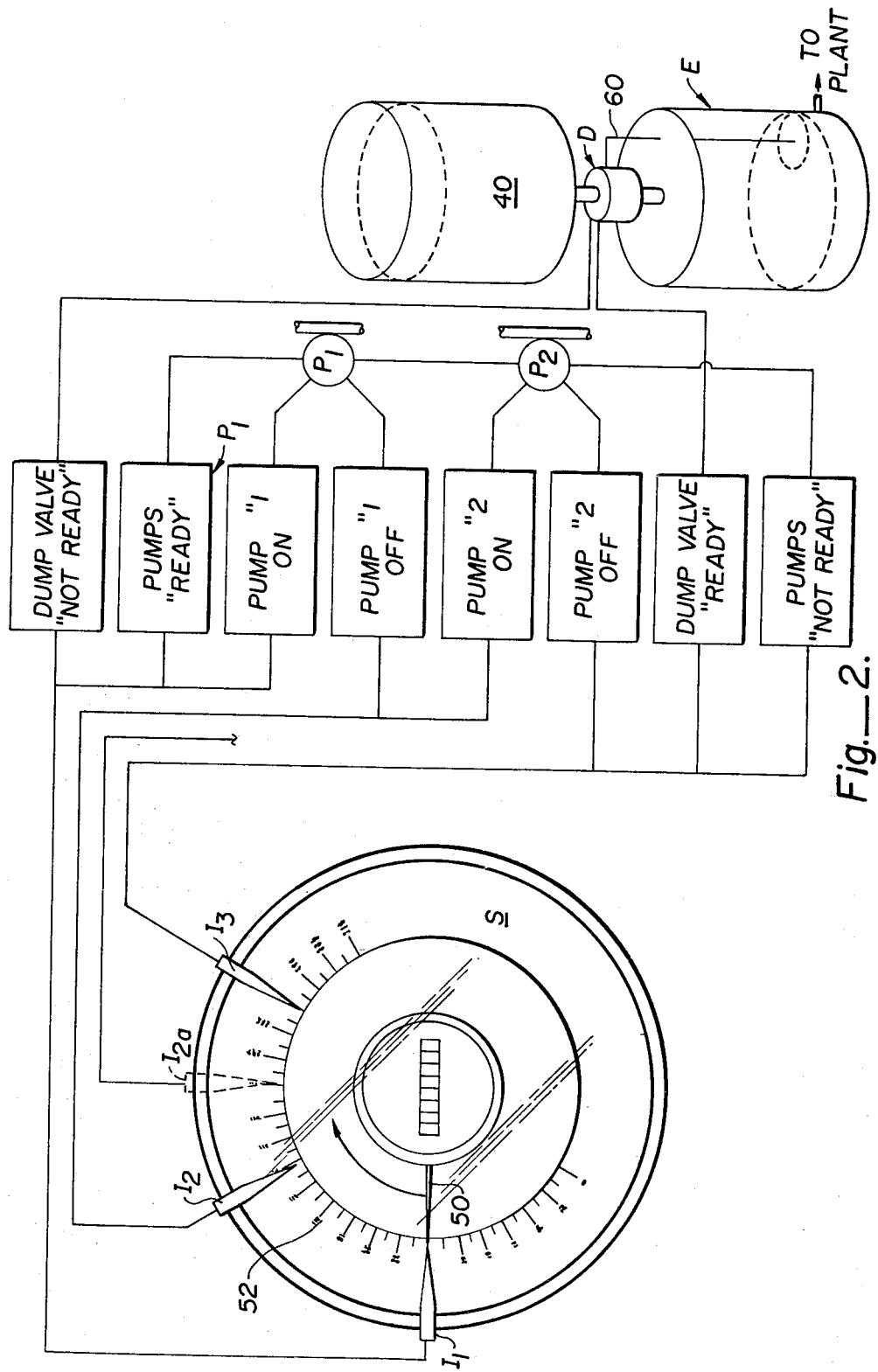
Fig._2.

CONTINUOUS OUTFLOW, WEIGHT-MEASURING BLENDER

This invention relates to metering or measuring on a continuous production basis and in particular to a constant outflow weight-measured blending facility.

SUMMARY OF THE PRIOR ART

Measuring or metering liquid constituents precisely in blended mixtures can most accurately be accomplished by weight measuring. Conventional metering of fluid flows through orifices presents difficulties. Viscosity changes with temperature, particulate clogging, and even jamming of positive displacement pumps or meters with resultant vapor trapping all contribute to the unreliability of meter measurement.

It is known to measure weight drop in outflowing reservoirs to effect weight measuring. See Latham U.S. Pat. No. 3,749,285. Weighing of such reservoirs, however, contains problems. First, the use of separate scales requires careful attention to scale accuracies and interconnections. Second, servicing or replenishing such reservoirs during the blending process is simply not possible with the weight of the supplying reservoirs utilized for measuring the output required for mixing. Finally, in such systems, there is no provision for a continuous outflow of product. Such systems are typically incapable of mixing while simultaneously providing a continuous outflow of fluid.

SUMMARY OF THE INVENTION

The continuous outflow, weight-measuring blender preferably contained in a separate and remote facility is connected to a constant output production facility, such as a plant for placing blended product in small marketable containers. The blender includes typical constituent inputs, such as solvent and solvent additive. Each of these constituents is supplied to the system by separate positive displacement pumps and piping leading to a common flex hose output to a weight-measuring tank. The weight-measuring tank is connected by positive mechanical connections, such as rods under tension, to a scale interior of the plant. The scale face has an indicator which undergoes excursion between positive sensors, such as electric eyes. When the system is electrically activated, a first position sensor detects zero weight from the measuring tank and remotely calls for the pumping of the first constituent, such as solvent. This pumping continues until the indicator in excursion reaches a second position indicator. Upon sensing the second position indicator, remote pumping of solvent ceases and remote pumping of solvent additive commences and continues until excursion of the indicator reaches a third position indicating sensor. At the third position indicator, remote pumping of additive ceases, the bottom dump valve is activated to a ready state, and the system cycle stops until emptying of the weight-measuring tank occurs. A blend-holding tank provides constant outflow to the production facility. When a probe measures a predetermined remaining level of blend within the blend-holding tank, the bottom dump valve when activated to the ready state remotely empties the weighted measuring tank by gravity flow. Upon excursion of the weight indicator to the zero position, the bottom dump valve closes and is deactivated from the ready state and the cycle repeats. Filling of storage tanks or otherwise supplying additional constituent liquids to the system can occur at any time, without interference with the weight-measuring process. Moreover, should the supply run short, the bottom dump valve will not be activated to the ready state; consequently, a partial blend of constituents, i.e., a blend of the incorrect proportion of constituent liquids, is prevented from exiting the blender.

One objective of this invention is to provide a weight-measuring system which affords a continuous supply of product, i.e., blend, to a production facility. For example, a weight-measuring tank dumps to a blend-holding reservoir, i.e., tank or facility, which assures a continuous outflow. By providing the weight-measuring tank with discrete cycles and dumping the weight-measuring tank on demand to a holding tank, continuous product outflow is assured.

Another objective of this invention is to utilize only one scale or other measuring means for the entire system. A scale is provided with a group of position indicators readily movable to varied positions on the scale face. The scale includes an indicator which undergoes excursion. By causing the position indicators to activate when the indicator registers to their position, and providing suitable connections to pumps, measured and sequenced additions of constituent liquids may be made to a common scale-connected weight-measuring tank.

One advantage of this invention is that system blending is controlled by a single scale-measured delivery of blended product only. Where either constituent liquid is not delivered in its preselected amount—as by a reservoir running empty—cycling of the system is interrupted until reservoir flow is restored.

Another advantage of this invention is that a limited amount of blended product is maintained. Inventory of input constituents, such as solvent additive, can be contained separately close to the blending site until blended product is needed.

An additional objective of this invention is to prevent discharge of partially weight-blended constituents, such as blends with inaccurate proportions of liquid constituents. Once blending begins, dumping of the weight-measuring tank is restrained by deactivation of the bottom dump valve. When the weight-blending cycle is completed, the bottom dump valve switches to the ready state. Thus, there can be no dumping of partially weight-blended materials.

Other objective, features, and advantages of this invention will become more apparent after reference to the attached specification and drawings. These include FIG. 1—a perspective view of a free-standing tower containing remote connection to a nearby production facility with the respective connections being mechanically schematically shown—and FIG. 2—a block diagram illustrating a scale with scale indicators connected to applicable solenoid circuitry for remote actuations.

To facilitate understanding of the invention, its mechanics will be described with respect to FIG. 1. The operational sequence of the described parts of FIG. 1 will be delineated utilizing the schematic of FIG. 2.

FIG. 1 contains a tower 14 having three levels 15, 16 and 17. Each of these levels supports a column of overlying tanks separately and apart from a main production facility building 18.

Upper level 17 contains weight-metering tank 40, where initial blending occurs when the constituents are miscible, compatible liquids. The present invention is particularly well-suited to blending liquid constituents which are miscible and compatible, and the figures and description will apply to such blend. However, it is within the scope of the present invention to blend and mix liquid constituents, and, therefore, mixing apparatus and additivies such as emulsifiers may be added as appropriate.

Additive is contained at ground level 15. Gravity flow of additive to fill tank 30 is provided from interior of building 18 through a conduit. Conventional underground storage of solvent occurs in underground tank 20.

A solvent additive system A includes solvent supply tank 20, here shown as an underground tank preferably situated for tank car unloading, such as at a railroad site. Tank 20 includes a conventional fill top 21 and an output to a positive displacement pump $P_1$. Pump $P_1$ is located at an output line having suction 22 and output 23. Output 23 communicates to a flex hose coupling 24.

An additive supply system B is also illustrated. Additive tank 30 has an output at a suction line 32 to a second positive displacement pump $P_2$. Output of pump $P_2$ through an output 33 communicates to the flex hose coupling 24.

The output of pumps $P_1$ and $P_2$ through flex hose 24 is to the weight-measuring system C, which includes weight-measuring tank 40 mounted to a conventional weighing platform 42. As platform 42 is conventional, it is only shown schematically having weight of constituent liquids interior of tank 40 measured by tension on cable 44 on a simple lever-supported platform.

Although the configuration and positioning of supply reservoirs for the liquid constituents are depicted in a manner which requires pumping of such constituents to the weight-measuring tank, the present invention is capable of positioning such supply reservoirs so that pumping is not necessary and the sequential provision of each constituent to the weight-measuring tank can alternatively occur by the actuation of dumping valves and gravity flows.

Cable 44 is connected to platform 42 at the lower end and to pivoted scale beam 45 at an end remote from a pivot. Through pivoted beam 45, the weight of the constituent liquids in tank 40 is measured at a scale S, such as that manufactured by the Toledo Scale Company of Toledo, Ohio. This particular scale has been adapted to measure tension exerted to the scale by cable 46 from pivoted beam 45.

Weight-measuring tank C includes a dump valve D to reservoir E. Reservoir or blending tank E holds blended liquid constituents, such as solvent and additive for output to a gravity feed line 48, which typically passes interior of the plant building 18 to bottling facilities. Tank E supplies a constant flow of blended constituents.

FIG. 2 illustrates a scale S, which includes an indicator 50 that undergoes excursion relative to indicia 52 labeled on background of the scale. As the contents of the weight-measuring tank 40 increase, corresponding excursion of the indicator 50 will occur.

Scale S includes three indicators $I_1$, $I_2$, and $I_3$ movably attached on the face of the scale S at preselected positions of excursion. These respective indicators have a signal output which will be explained below.

Returning to FIG. 2, a connection of the indicators to activating circuitry can be understood with respect to the block diagram. When indicator 50 registers to position indicator $I_1$, the signal output will result in two actions. First, dump valve D will be deactivated for move to the "not ready" state. Second, positive displacement pump $P_1$ will be turned on.

Pump $P_1$ will fill tank 40 until indicator 50 registers to position indicator $I_2$. At this point, the signal output from indicator $I_2$ will turn pump $P_1$ off and cause pump $P_2$ to commence pumping. Flow of solvent through flex hose 24 into weighing tank 40 will cease and flow of additive through flex hose 24 to tank 40 will commence.

With flow of additive, indicator 50 will undergo excursion to position indicator $I_3$. When position indicator 50 registers indicator $I_3$, $P_2$ will be turned to the off position. Dump valve D will be activated to the ready position. Weight-measuring tank 40 will have the preselected amounts of each of the blend constituents ready for deposit to blend-holding tank E.

Dumping of the weight-blending tank 40 occurs in the following manner. Typically, dumping valve D is connected to a probe 60, which measures the level of blend within reservoir E. When this level falls below a predetermined level and dump valve D is in the ready state, gravitational dumping of the contents of the weight-mixing tank 40 occurs. Return of indicator 50 into registry with position indicator $I_1$ follows, and repeat of the cycle previously described can occur.

It will be apparent that the system here illustrated will not permit the dumping of a partially blended batch of constituents. As dump valve D will not move "to the ready" state until the preselected weight of each constituent liquid is present in the weight-blending tank 40, discharge of less than the blend of preselected weights of solvent and additive cannot occur.

It is possible that when indicator 50 sweeps in reverse (counterclockwise), position indicator $I_2$ may cause inadvertent starting of pump $P_2$ (or other pumps). To prevent this, indicator $I_3$ also actuates a pumps "not ready" circuit, which could interrupt power to both pumps. Any conventional hydraulic, pneumatic, or electric means may inhibit pumping during actuation of the "not ready" circuit. For example, a solenoid could block air to a pneumatically actuated valve. Upon registration of indicator 50 to position indicator $I_1$ (zero position), a pumps "ready" circuit is actuated. Thus, upon counterclockwise excursion of indicator 50 through intermediate position indicators between indicators $I_1$, $I_3$, starting of pumps cannot occur.

It should be apparent that the specified invention will admit more than two constituents. For example, by placing additional indicators such as indicator $I_{2a}$ (shown in broken lines) with appropriate tanks, pipes and sequential batches of liquids can be weight-metered in accordance with this invention.

What is claimed is:

1. Apparatus for providing a continuous supply of a weight measured blend of at least two constituent liquids to a main production facility building, said apparatus comprising:

a free standing tower having at least an uppermost level and a level immediately below said uppermost level; a weight-measuring tank contained within said uppermost level having at least one input and at least one output; weighing means including a scale having an indicator undergoing excursion disposed interior said main production facility building and a weighing platform disposed in said uppermost level, said weight-measuring tank supported on said weighing platform, said weighing platform operatively connected to said scale so that said indicator undergoes excursion upon said weight measuring tank receiving increasing contents; a blend-holding reservoir disposed in said level immediately below said uppermost level in substantial vertical alignment with said weight-measuring tank for receiving gravitationally flowing output of said weight-measuring tank; a dump valve and included conduit between said blend-holding reservoir and weight-measuring tank for releasing said liquid constituents to flow by gravity from said weight-measuring tank whereby blended liquid constituents enter said blend-holding reservoir; means for opening said dump valve upon said reservoir having blend content below a predetermined amount; at least first, second, and third position indicators on the face of said scale for generating respective sequential first, second, and third output signals responsive to the excursion fo said indicator on said scale from said first position to said third position; a first constituent liquid input system having a first pump for inputting a first constituent liquid to said weight-measuring tank; a second constituent liquid input system having a second pump for inputting a second constituent liquid to said weight-measuring tank; means for causing said first signal to actuate said first constituent liquid input system to input said first constituent liquid to said weight-measuring tank; means for causing said second signal to actuate cessation of inputting of said first constituent liquid and commencement of inputting of said second constituent liquid; first means for causing said third signal to actuate cessation of inputting from said second constituent liquid input system; second means for causing said third signal to actuate a pumps not ready circuit to prevent actuation of the pumps upon the reverse excursion of said indicator from and between the third position to the first position: and means connected to said first and third indicators for deactivating said dump valve during inputting from said respective first and second constituent liquid input systems, whereby partially blended constituents cannot be released to said reservoir, at least one of said position indicators on said scale being removeably attachable to said scale to generate a signal at different positions of excursion of said indicator on said scale whereby the blending of constituents in said free standing tower is remotely controlled from said scale interior of said main production facility building.

* * * * *